US006720738B2

United States Patent
Keggenhoff et al.

(10) Patent No.: US 6,720,738 B2
(45) Date of Patent: Apr. 13, 2004

(54) METHOD AND CIRCUIT ARRANGEMENT FOR PRODUCING AN IGNITION VOLTAGE FOR FLUORESCENT LAMPS

(75) Inventors: Ralf Keggenhoff, Sundern (DE); Ferdinand Mertens, Arnsberg (DE)

(73) Assignee: Trilux-Lenze GmbH & Co. KG, Arnsberg (DE)

(*) Notice: Subject to any disclaimer, the term of this patent is extended or adjusted under 35 U.S.C. 154(b) by 0 days.

(21) Appl. No.: 10/239,070

(22) PCT Filed: Mar. 16, 2001

(86) PCT No.: PCT/DE01/01011
§ 371 (c)(1),
(2), (4) Date: Sep. 17, 2002

(87) PCT Pub. No.: WO01/69986
PCT Pub. Date: Sep. 20, 2001

(65) Prior Publication Data
US 2003/0057872 A1 Mar. 27, 2003

(30) Foreign Application Priority Data
Mar. 17, 2000 (DE) ........................... 100 13 342

(51) Int. Cl.$^7$ .............................. H05B 4/16; G05F 1/00
(52) U.S. Cl. ...................................... 315/224; 315/291
(58) Field of Search ............................ 315/224, 225, 315/119, 127, 291, 307, 240, 209, 94, 101, 102, 105, 106, DIG. 5, DIG. 7

(56) References Cited

U.S. PATENT DOCUMENTS

| | | | | |
|---|---|---|---|---|
| 4,538,093 A | * | 8/1985 | Melai | 315/219 |
| 5,424,611 A | * | 6/1995 | Moriarty, Jr. | 315/94 |
| 5,444,336 A | * | 8/1995 | Ozawa et al. | 315/307 |
| 5,463,284 A | * | 10/1995 | Mattas | 315/240 |
| 5,563,473 A | * | 10/1996 | Mattas et al. | 315/240 |
| 5,962,988 A | * | 10/1999 | Nuckolls et al. | 315/291 |
| 6,140,779 A | * | 10/2000 | Kanazawa et al. | 315/291 |
| 6,160,361 A | * | 12/2000 | Giannopoulos et al. | 315/307 |
| 6,194,842 B1 | * | 2/2001 | Canova | 315/225 |
| 6,339,299 B1 | * | 1/2002 | Wu et al. | 315/244 |
| 6,541,923 B1 | * | 4/2003 | Tyson | 315/224 |

* cited by examiner

Primary Examiner—Wilson Lee
Assistant Examiner—Chuc Tran
(74) Attorney, Agent, or Firm—Grossman, Tucker, Perreault & Pfleger, PLLC

(57) ABSTRACT

The invention, which relates to a method for generating a starting voltage for a fluorescent lamp, in which the starting voltage is generated by means of alternating voltage that is impressed on an LC series resonant circuit, and to a corresponding circuit arrangement, is based on the object of increasing the reliability of starting and avoiding maximum permissible starting voltages being exceeded. According to the invention, this object is solved in that the frequency of the alternating-voltage generator can be controlled by a control unit and in that a measuring circuit is connected to the control unit, whereby the alternating voltage can be gradually reduced from a high frequency to a lower frequency, where the lamp voltage is compared to a setpoint value at certain intervals and the starting procedure terminated when the setpoint value is reached.

18 Claims, 3 Drawing Sheets

Figure 1:
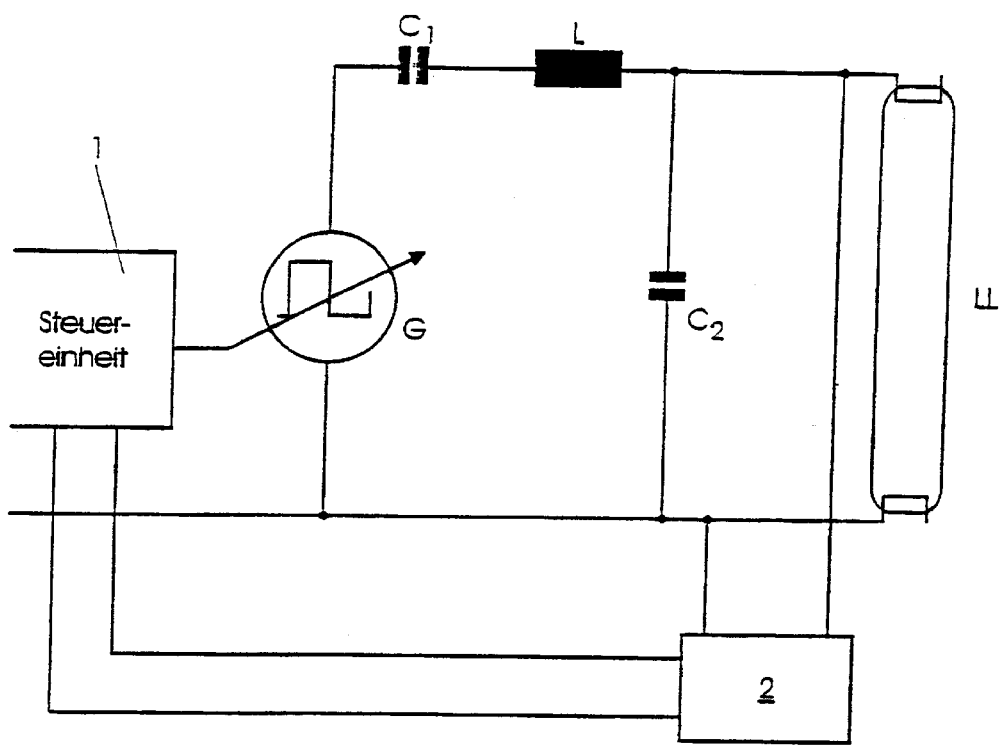

METHOD AND CIRCUIT ARRANGEMENT FOR PRODUCING AN IGNITION VOLTAGE FOR FLUORESCENT LAMPS

1. FIELD OF THE INVENTION

The invention relates to a method for generating a starting voltage for a fluorescent lamp, in which an LC series resonant circuit is supplied during the starting procedure with an alternating voltage having a frequency in the region of a resonant frequency determined by the components involved in the series resonant circuit. The voltage across a capacitor of the LC series resonant circuit is fed to the fluorescent lamp connected in parallel to the capacitor.

The invention also relates to a circuit arrangement for generating a starting voltage for a fluorescent lamp, with an LC series resonant circuit and an alternating-voltage generator connected to the resonant circuit, where the fluorescent lamp is connected in parallel to a capacitor of the LC series resonant circuit.

2. BACKGROUND OF THE INVENTION

A method of the kind mentioned above and a circuit arrangement of the kind mentioned above are known from European Patent Application 0 889 675, for example, in which an LC series resonant circuit is supplied with a high-frequency alternating voltage. If this alternating voltage lies within the resonant frequency of the components involved in the series resonant circuit, a voltage is generated at a capacitor of the LC series resonant circuit that corresponds to the starting voltage of the fluorescent lamp connected in parallel to the capacitor. The generation of this starting voltage causes the fluorescent lamp to start, the starting procedure thereby being completed. Thereafter, only the voltage required for normal operation is applied to the fluorescent lamp.

However, component tolerances of the components involved in the series resonant circuit can lead to substantial variation of the resonant frequency of the resonant circuit. As a result, the frequency of the alternating voltage during the starting procedure (starting frequency) is no longer in the intended resonance with the series resonant circuit, meaning that there can be significant variation of the starting voltage. In this context, either the starting voltage can be too low, in which case the lamp may not start, or the starting voltage can also be too high, which could lead to destruction of the device in the event of a fault, for instance if the lamp is defective.

3. SUMMARY OF THE INVENTION

The object of the invention is thus to describe a method and a circuit arrangement for generating a starting voltage for fluorescent lamps, in which the reliability of starting is increased and the exceeding of maximum permissible starting voltages is avoided.

With regard to the method, the object is solved in that the alternating voltage is impressed on the LC series resonant circuit with a first starting frequency $f_1$ over a first time interval. After the first time interval, the voltage at the fluorescent lamp is measured and compared with a setpoint value. When the setpoint value is reached, generation of the starting voltage is discontinued and a voltage for normal operation of the fluorescent lamp is applied. These process steps are repeated for an n-th time interval with an n-th starting frequency, where n=1 ... m, until the setpoint value is reached. In this context, the first starting frequency $f_1$ corresponds to a maximum value of the resonant frequency, as determined by the tolerance of the components involved. The m-th starting frequency $f_m$ corresponds to a minimum value of the resonant frequency, as determined by the tolerance of the components involved. Each n-th starting frequency $f_n$ is smaller than its preceding starting frequency $f_{n-1}$.

By varying the starting frequencies of the alternating voltage applied to the LC series resonant circuit, the possible tolerance range of the resonant frequency is "worked through" until the necessary value of a starting voltage for the fluorescent lamp is reached. This avoids an insufficient starting voltage being generated due to a lack of resonance and the lamp failing to start as a result. On the other hand, measuring the starting voltage and comparing it with the setpoint value avoids an excessive starting voltage being generated, which could possibly destroy the device.

In a favourable embodiment of the invention, provision is made for each n-th starting frequency $f_n$ to be an amount $\Delta f$ smaller than its preceding starting frequency $f_{n-1}$. The following equation applies in this context:

$$\Delta f = \frac{(f_1 - f_m)}{(m-1)}.$$

As a result of this design of the invention, the frequency is changed in equidistant intervals, this permitting optimum adjustment.

In a further embodiment of the method according to the invention, provision is made for the measuring sensitivity when measuring the voltage applied to the fluorescent lamp to be switched between a lower measuring sensitivity during the starting procedure and a higher measuring sensitivity during normal operation.

Very large voltage amplitudes are obtained when measuring the lamp voltage during the starting procedure and in normal operation. If this lamp voltage is measured with the same measuring sensitivity, measurement of the lamp voltage in normal operation, when the lamp voltage has a far smaller amplitude compared to the starting procedure, would have very poor resolution, this being avoided by this solution according to the invention.

With regard to the device, the object is solved in that the frequency of the alternating-voltage generator can be controlled by a control unit and that a measuring circuit is connected to the control unit.

Given the possibility of varying the frequency of the alternating-voltage generator, the lamp voltage can be set as a function of the measurements obtained via the measuring circuit. This achieves a gradual change in the starting frequency, so as to obtain a starting voltage at all, even in the event of major component differences, and also to avoid a maximum permissible starting voltage being exceeded.

In an expedient embodiment of the circuit arrangement, provision is made for the control unit to contain a controller. A controller of this kind permits simple realisation of an analysis and control program for controlling the starting frequency profile.

In another embodiment of the circuit arrangement according to the invention, provision is made for the measuring circuit to contain a range extension circuit. This range extension circuit consists of a voltage divider with a first and second measuring resistor. In this context, the input voltage of the range extension circuit is applied via the first and second measuring resistors. The output voltage of the range extension circuit is applied via the second measuring resistor. In this context, at least a third measuring resistor is provided, which can be connected in parallel to the second measuring resistor by means of a switch.

Switching-on the second measuring resistor results in parallel connection of the second and third measuring resistors, the total resistance of which is smaller than that of the second measuring resistor. This means that a lower output voltage is obtained at the same input voltage. In other words, if very large amplitudes are to be measured as the input voltage, the third measuring resistor is switched on and the output voltage thus attenuated by an amount defined by the measuring resistors. If smaller amplitudes are to be measured as the input voltage, the switch is used to deactivate this parallel connection, as a result of which the output voltage is not attenuated. Consequently, the output voltage can always be of the same order of magnitude as the amplitude and thus measured with the same resolution.

In an expedient embodiment, provision is made for the switch to be designed as an additional output of the controller. A so-called "port pin" is used for this purpose, which, for example, establishes connection to earth when appropriately activated by the controller. This means that, under the control of the controller, the measuring range can be switched over as soon as the controller detects a difference between the lamp voltage during the starting procedure and in normal operation, for example.

The invention is explained in more detail below on the basis of a practical example. The associated drawings show the following:

4. BRIEF DESCRIPTION OF THE DRAWINGS

Figure 2:
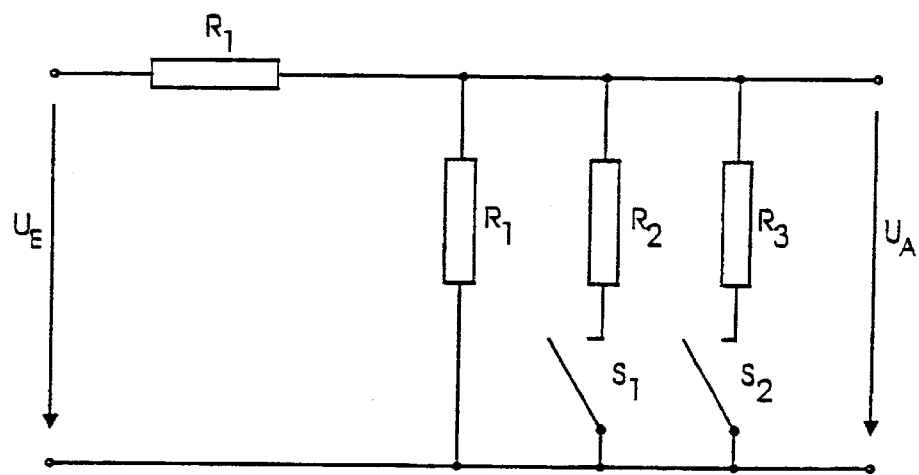
Figure 3:
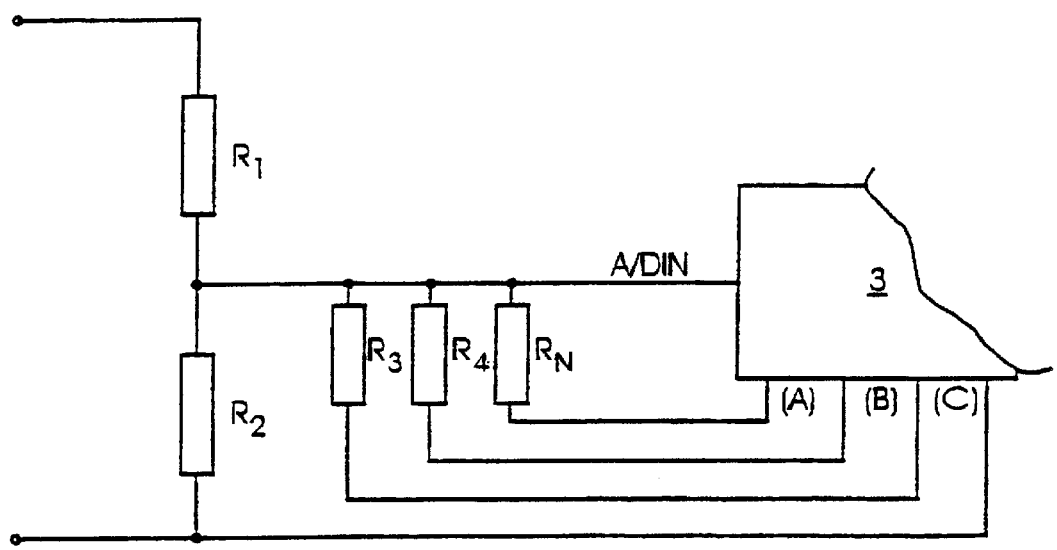

FIG. 1 A block diagram of a circuit arrangement according to the invention,

FIG. 2 A block diagram of a range extension circuit,

FIG. 3 A range extension circuit using a controller, and

Figure 4:
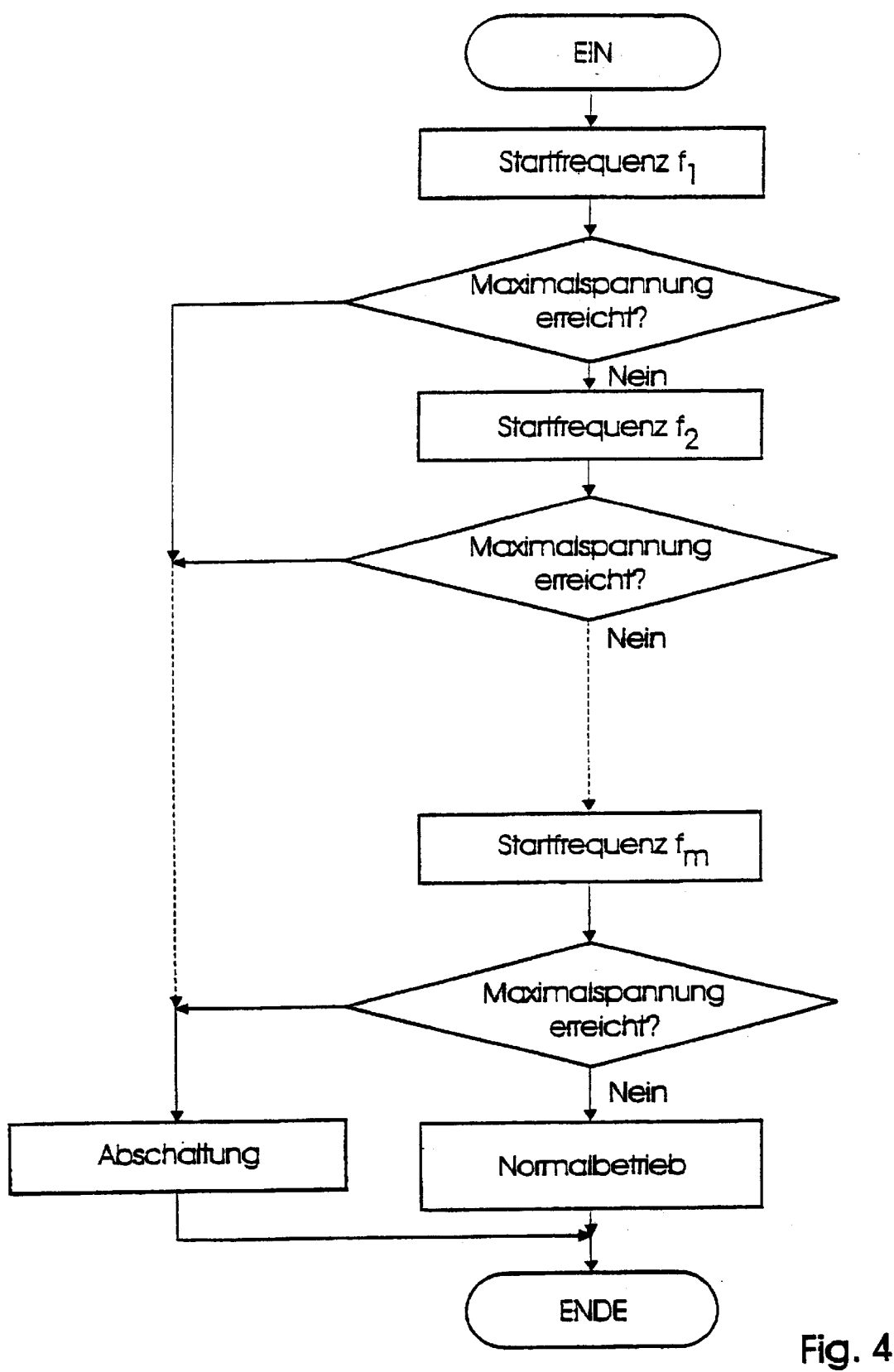
Figure 1:
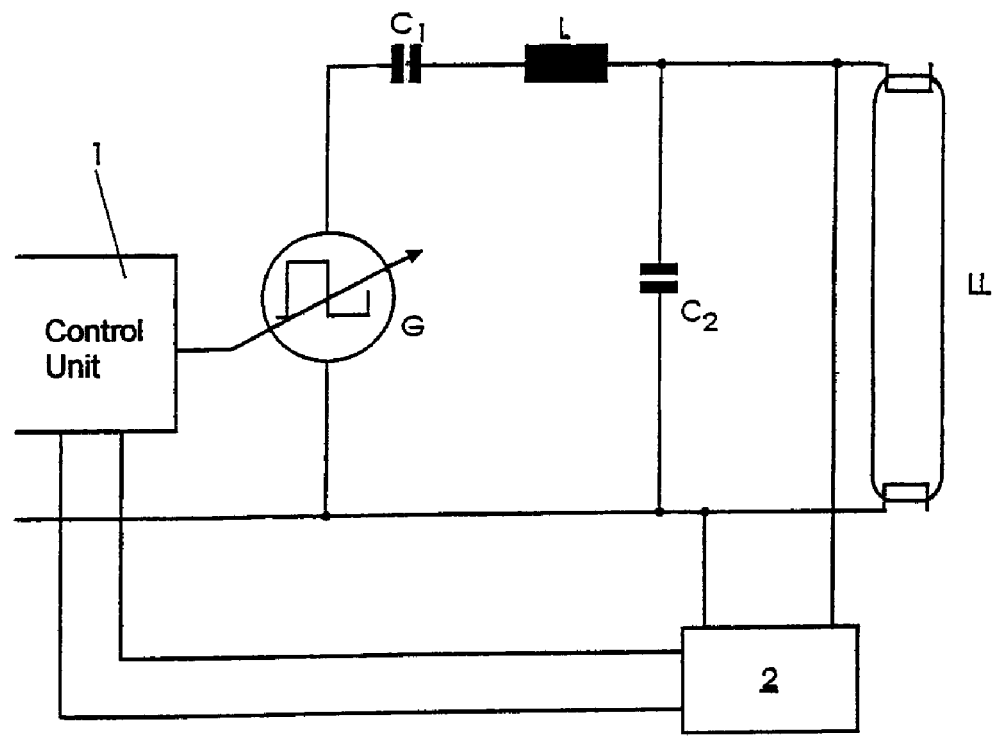
Figure 2:
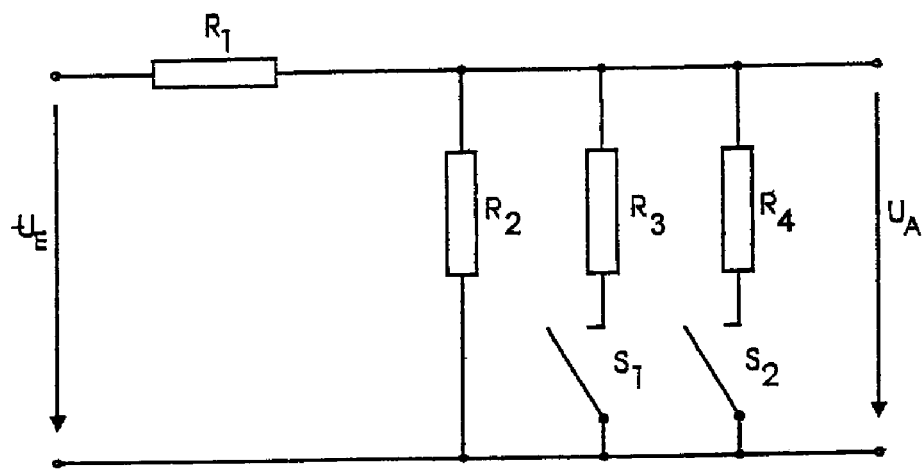
Figure 3:
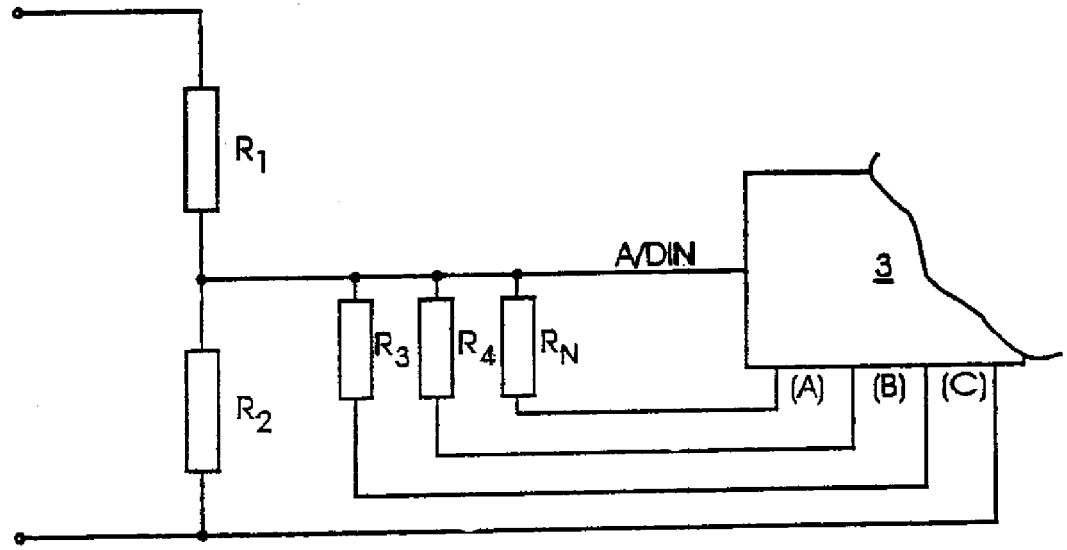
Figure 4:
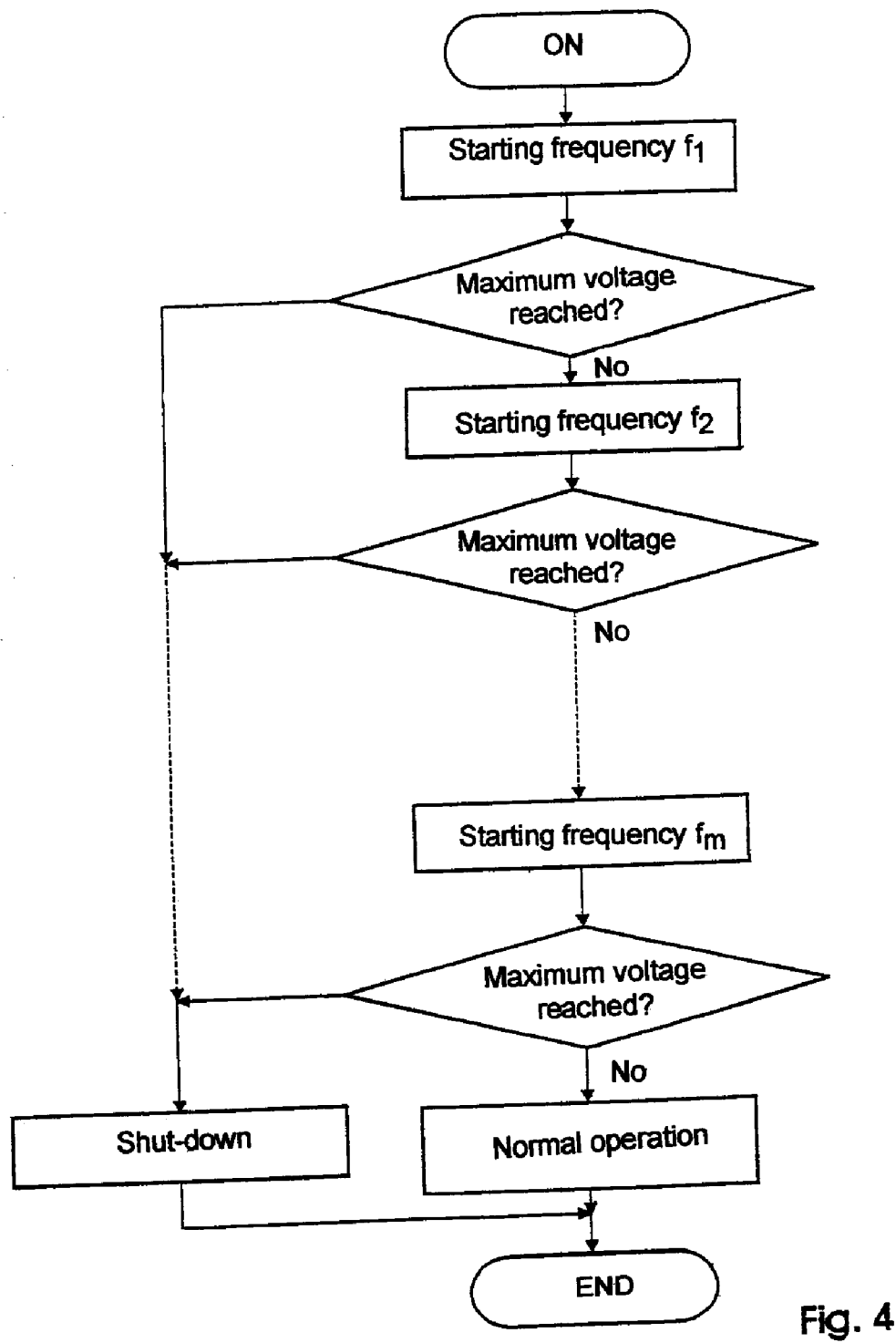

FIG. 4 A flow chart of the method according to the invention.

5. DETAILED DESCRIPTION OF EXEMPLARY EMBODIMENTS

As illustrated in FIG. 1, a circuit arrangement according to the invention displays an LC series resonant circuit with a first capacitor C1, a second capacitor C2 and an inductor L. Fluorescent lamp LL is connected in parallel to second capacitor C2. In addition, the LC series resonant circuit is connected to alternating-voltage generator G. The frequency of alternating-voltage generator G can be controlled by control unit 1. Measuring circuit 2, which is connected to control unit 1, is provided for measuring the voltage across fluorescent lamp LL.

Measuring circuit 2 contains a range extension circuit, the principle of which is illustrated in FIG. 2. The range extension circuit comprises a voltage divider a first measuring resistor $R_1$ and a second measuring resistor $R_2$. In this context, input voltage $U_E$ is applied via first measuring resistor $R_1$ and second measuring resistor $R_2$. Output voltage $U_A$ is applied via the second measuring resistor. As furthermore illustrated in FIG. 2, a third measuring resistor $R_3$ and a fourth measuring resistor $R_4$ are also provided. Third measuring resistor $R_3$ can be connected in parallel to second measuring resistor $R_2$ via switch $S_1$, and fourth measuring resistor $R_4$ via switch $S_2$.

As illustrated in FIG. 3, the circuit arrangement can also contain several more measuring resistors $R_N$.

While measuring resistors $R_3$ and $R_4$ were switched on via switches in the illustration in FIG. 2, controller 3 is used in FIG. 3, port pins B and C of which replace switches $S_1$ and $S_2$. In the same way, port pin A replaces any further switches for further resistors $R_N$.

As illustrated in FIG. 4, a first starting frequency $f_1$ is initially set on alternating-voltage generator G via control unit 1 after switching on. This produces a lamp voltage across fluorescent lamp LL, which is measured by measuring circuit 2. Control unit 1 then compares this with a setpoint value for the maximum voltage across fluorescent lamp LL. If this maximum voltage has not yet been reached, a second starting frequency $f_2$, which is lower than the first starting frequency $f_1$, is set on alternating-voltage generator G. However, if the maximum voltage is already reached after starting frequency $f_1$, the starting procedure is switched off. Otherwise, the lamp voltage is measured and another comparison made to determine whether the voltage has reached the setpoint value, i.e. maximum voltage. If this is the case, the starting procedure is again switched off. If this is not the case, the starting frequency is reduced once again. This procedure is repeated up to starting frequency $f_m$. If the maximum voltage is still not reached, even after setting the last starting frequency $f_m$, a transition is made to normal operation in this practical example. The method according to the invention is thus terminated.

LIST OF REFERENCE NUMBERS $C_1$ First capacitor
$C_2$ Second capacitor
L Inductor
LL Fluorescent lamp
G Alternative-voltage generator
$R_1$ First measuring resistor
$R_2$ Second measuring resistor
$R_3$ Third measuring resistor
$R_4$ Fourth measuring resistor
$R_N$ Further measuring resistors
$S_1$ First switch
$S_2$ Second switch
$U_E$ Input voltage
$U_A$ Output voltage
A Port pin
B Port pin
C Port pin
1 Control unit
2 Measuring circuit
3 Controller

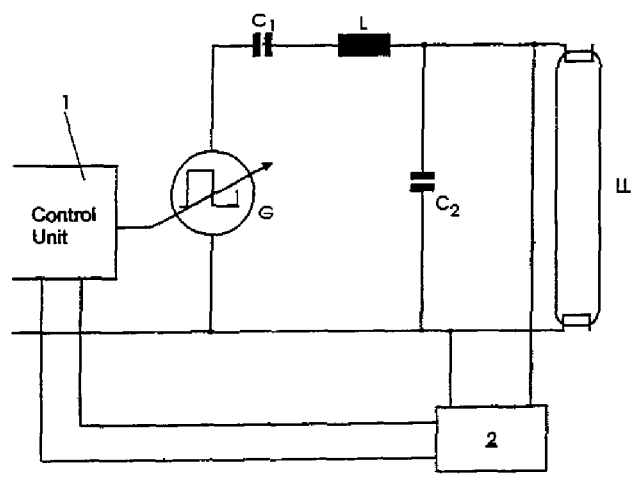

What is claimed is:

1. A method for starting a fluorescent lamp, said method comprising the steps of:
    generating a starting voltage having a first starting frequency ($f_1$) during a first time interval;
    impressing said starting voltage having said first starting frequency onto an LC resonant circuit, thereby generating a first high voltage, and supplying said first high voltage to the fluorescent lamp;
    measuring said first high voltage across said fluorescent lamp; and
    comparing said first high voltage across said fluorescent lamp with a preselected setpoint value.

2. A method as claimed in claim 1, further comprising the step of:
    discontinuing said starting voltage if said first high voltage across said fluorescent lamp approximately equals said preselected setpoint value.

3. A method as claimed in claim 2, further comprising the step of:

determining said maximum value of said LC resonant circuit by determining the tolerance of at least the inductor (L) and capacitor (C) that forms said LC resonant circuit.

4. A method as claimed in claim 1, further comprising the step of:

setting said first starting frequency corresponding to the maximum value of said LC resonant circuit.

5. A method as claimed in claim 4, further comprising the step of:

determining said maximum value of said LC resonant circuit by determining the tolerance of at least the inductor (L) and capacitor (C) that forms said LC resonant circuit.

6. A method as claimed in claim 5, further comprising the step of:

determining said minimum value of said LC resonant circuit by determining the tolerance of-at least the inductor (L) and capacitor (C) that forms said LC resonant circuit.

7. A method as claimed in claim 1, further comprising the steps of:

generating the starting voltage with n starting frequencies over n time intervals, wherein n=2 . . . m;

repeating said impressing step with each said n-th starting frequency in each said n-th time interval; thereby generating an n-th high voltage and supplying said n-th high voltage to said lamp repeating said measuring step with each said n-th starting frequency in each said n-th time interval across said fluorescent lamp; and repeating said comparing step with each said n-th starting frequency in each said n-th time interval to compare said n-th high voltage with said preselected setpoint value.

8. A method as claimed in claim 7, further comprising the step of:

discontinuing said starting voltage when, during an n-th time interval, said n-th high voltage across said fluorescent lamp approximately equals said preselected setpoint value.

9. A method as claimed in claim 8, further comprising the step of:

using $\Delta f=(f_1-f_m)*1/(m-1)$ to determine each said n-th starting frequency.

10. A method for starting a fluorescent lamp, said method comprising the steps of:

generating a starting voltage with n starting frequencies over n time intervals, wherein n=1 . . . m;

impressing said starting voltage, with each said n-th starting frequency in each said n-th time interval, onto an LC resonant circuit, thereby generating an n-th high voltage and supplying said n-th high voltage to the fluorescent lamp;

measuring said n-th high voltage across said fluorescent lamp during each said n-th time interval; and comparing each said n-th high voltage across said lamp with a preselected setpoint value during each said n-th time interval.

11. A method as claimed in claim 10, further comprising the step of:

discontinuing said starting voltage when, during an n-th time interval, said n-th high voltage across said fluorescent lamp approximately equals said preselected setpoint value.

12. A method as claimed in claim 10, further comprising the step of:

setting the first starting frequency (n=1) corresponding to the maximum value of said LC resonant circuit.

13. A method as claimed in claim 10, further comprising the step of:

setting the last starting frequency (n=m) to the minimum value of said LC resonant circuit.

14. A method as claimed in claim 10, further comprising the step of:

generating each said n-th starting frequency so that each n-th starting frequency ($f_n$) is lower by an amount $\Delta f$ than the preceding starting frequency ($f_{n-1}$).

15. A circuit for starting a lamp, comprising a controllable voltage generator adapted to generate a starting voltage with a controllable starting frequency; a measuring circuit adapted to measure the starting voltage across the lamp with a preselected setpoint value and generate a control signal indicative of said measurement; and a controller receiving said control signal and controlling said voltage generator to change the frequency of said starting voltage.

16. A circuit as claimed in claim 15, said circuit further comprising an LC resonant circuit coupled between said voltage generator and said lamp, said LC resonant circuit receiving said starting voltage and generating a high voltage having a value corresponding to the frequency of said starting voltage.

17. A circuit as claimed in claim 15, wherein said controller adapted to discontinue said starting voltage when said starting voltage is approximately equal to said preselected setpoint value.

18. A circuit as claimed in claim 15, said controller further adapted to control said voltage generator to step through a series of frequencies from a highest frequency to a lowest frequency until said starting voltage is approximately equal to said preselected setpoint value.

* * * * *

UNITED STATES PATENT AND TRADEMARK OFFICE
CERTIFICATE OF CORRECTION

PATENT NO. : 6,720,738 B2
DATED : April 13, 2004
INVENTOR(S) : Keggenhoff et al.

It is certified that error appears in the above-identified patent and that said Letters Patent is hereby corrected as shown below:

Title page illustrating a drawing figure should be deleted, and substitute therefor a title page illustrating a figure as shown on the attached sheet Delete drawing sheets 1-3, and substitute therefore drawing sheets 1-3 (Attached)

Signed and Sealed this

Twenty-eighth Day of December, 2004

JON W. DUDAS
*Director of the United States Patent and Trademark Office*

(12) United States Patent
Keggenhoff et al.

(10) Patent No.: US 6,720,738 B2
(45) Date of Patent: Apr. 13, 2004

(54) METHOD AND CIRCUIT ARRANGEMENT FOR PRODUCING AN IGNITION VOLTAGE FOR FLUORESCENT LAMPS

(75) Inventors: Ralf Keggenhoff, Sundern (DE); Ferdinand Mertens, Arnsberg (DE)

(73) Assignee: Trilux-Lenze GmbH & Co. KG, Arnsberg (DE)

(*) Notice: Subject to any disclaimer, the term of this patent is extended or adjusted under 35 U.S.C. 154(b) by 0 days.

(21) Appl. No.: 10/239,070
(22) PCT Filed: Mar. 16, 2001
(86) PCT No.: PCT/DE01/01011
§ 371 (c)(1), (2), (4) Date: Sep. 17, 2002
(87) PCT Pub. No.: WO01/69986
PCT Pub. Date: Sep. 20, 2001

(65) Prior Publication Data
US 2003/0057872 A1 Mar. 27, 2003

(30) Foreign Application Priority Data
Mar. 17, 2000 (DE) .......................... 100 13 342

(51) Int. Cl.[7] .................. H05B 4/16; G05F 1/00
(52) U.S. Cl. ........................ 315/224; 315/291
(58) Field of Search ...................... 315/224, 225, 315/119, 127, 291, 307, 240, 209, 94, 101, 102, 105, 106, DIG. 5, DIG. 7

(56) References Cited
U.S. PATENT DOCUMENTS

| | | | | |
|---|---|---|---|---|
| 4,538,093 A | * | 8/1985 | Melai | 315/219 |
| 5,424,611 A | * | 6/1995 | Moriarty, Jr. | 315/94 |
| 5,444,336 A | * | 8/1995 | Ozawa et al. | 315/307 |
| 5,463,284 A | * | 10/1995 | Mattas | 315/240 |
| 5,563,473 A | * | 10/1996 | Mattas et al. | 315/240 |
| 5,962,988 A | * | 10/1999 | Nuckolls et al. | 315/291 |
| 6,140,779 A | * | 10/2000 | Kanazawa et al. | 315/291 |
| 6,160,361 A | * | 12/2000 | Giannopoulos et al. | 315/307 |
| 6,194,842 B1 | * | 2/2001 | Canova | 315/225 |
| 6,339,299 B1 | * | 1/2002 | Wu et al. | 315/244 |
| 6,541,923 B1 | * | 4/2003 | Tyson | 315/224 |

* cited by examiner

*Primary Examiner*—Wilson Lee
*Assistant Examiner*—Chuc Tran
(74) *Attorney, Agent, or Firm*—Grossman, Tucker, Perreault & Pfleger, PLLC

(57) ABSTRACT

The invention, which relates to a method for generating a starting voltage for a fluorescent lamp, in which the starting voltage is generated by means of alternating voltage that is impressed on an LC series resonant circuit, and to a corresponding circuit arrangement, is based on the object of increasing the reliability of starting and avoiding maximum permissible starting voltages being exceeded. According to the invention, this object is solved in that the frequency of the alternating-voltage generator can be controlled by a control unit and in that a measuring circuit is connected to the control unit, whereby the alternating voltage can be gradually reduced from a high frequency to a lower frequency, where the lamp voltage is compared to a setpoint value at certain intervals and the starting procedure terminated when the setpoint value is reached.

18 Claims, 3 Drawing Sheets